(12) United States Patent
Daum et al.

(10) Patent No.: US 8,299,974 B2
(45) Date of Patent: Oct. 30, 2012

(54) METHOD OF MAKING A VEHICLE ANTENNA

(75) Inventors: Uwe Daum, Filderstadt (DE); Uwe Kreissig, Eschenbach (DE); Markus Pfletschinger, Eningen (DE); Bernd Schwarz, Walddorf-Haeslach (DE)

(73) Assignee: Hirschmann Car Communication GmbH, Neckartenzlingen (DE)

( * ) Notice: Subject to any disclaimer, the term of this patent is extended or adjusted under 35 U.S.C. 154(b) by 395 days.

(21) Appl. No.: 12/597,553

(22) PCT Filed: Oct. 16, 2008

(86) PCT No.: PCT/EP2008/008776
§ 371 (c)(1),
(2), (4) Date: Oct. 26, 2009

(87) PCT Pub. No.: WO2009/049891
PCT Pub. Date: Apr. 23, 2009

(65) Prior Publication Data
US 2010/0141540 A1 Jun. 10, 2010

(30) Foreign Application Priority Data

Oct. 16, 2007 (DE) .......................... 10 2007 049 433
Dec. 21, 2007 (DE) .......................... 10 2007 062 142

(51) Int. Cl.
*H01Q 1/32* (2006.01)

(52) U.S. Cl. .......................................... 343/713; 29/600
(58) Field of Classification Search .................. 343/713, 343/711, 700 MS; 29/600
See application file for complete search history.

(56) References Cited

U.S. PATENT DOCUMENTS

| 5,363,114 A | * | 11/1994 | Shoemaker | ................... 343/828 |
| 7,193,576 B2 | * | 3/2007 | Yazdandoost et al. | ......... 343/767 |
| 7,317,424 B2 | * | 1/2008 | Onishi et al. | .................. 343/713 |
| 2007/0052601 A1 | | 3/2007 | Onishi | .......................... 343/713 |

FOREIGN PATENT DOCUMENTS

| DE | 972393 | | 7/1959 |
| DE | 10 2005009443 | * | 9/2006 |
| WO | WO-2006092188 | | 9/2006 |

* cited by examiner

*Primary Examiner* — Hoanganh Le
(74) *Attorney, Agent, or Firm* — Andrew Wilford

(57) ABSTRACT

The invention relates to a method for producing a vehicle antenna device (1) and to a vehicle antenna device (1) which is produced using this method and has a carrier film (2) which is composed of an electrically non-conductive material, wherein antenna structures (3) which are composed of an electrically conductive material are applied to the carrier film (2), wherein provision is made, according to the invention, for a plug connector (4) or an electronic device (6) to be fixed and electrically contact-connected directly to the carrier film (2) at a base point of the antenna structure (3).

8 Claims, 9 Drawing Sheets

METHOD OF MAKING A VEHICLE ANTENNA

CROSS REFERENCE TO RELATED APPLICATIONS

This application is the US national phase of PCT application PCT/EP2008/008776, filed 16 Oct. 2008, published 23 Apr. 2009 as WO2009/049891, and claiming the priority of German patent application 102007049433.7 itself filed 16 Oct. 2007 and German patent application 102007062142.8 itself filed 21 Dec. 2007, whose entire disclosures are herewith incorporated by reference.

FIELD OF THE INVENTION

The invention relates to a method of making a vehicle antenna and to a vehicle antenna produced using this method.

BACKGROUND OF THE INVENTION

Methods are known of making vehicle antennas that have a is support film of a dielectric material, antenna elements and leads of an electrically conductive material on the support film. Furthermore, one or more connection lines are carried by the support film for connection of the antenna elements, or multiple antenna elements to an electronic device, particularly an antenna amplifier. However, this has the disadvantage that an extra support film and the connection line located thereon must additionally be produced in order to be able to connect the vehicle antenna to the electronic device.

OBJECT OF THE INVENTION

The object of the invention is therefore to provide a method of making a vehicle antenna, and a vehicle antenna produced using this method that is further improved with regard to the production, storage, and also with regard to the installation thereof.

SUMMARY OF THE INVENTION

According to the invention the method of making the vehicle antenna is characterized in that a plug-type connector is attached to a base of the antenna elements, or an electronic device is applied to the support film and is electrically contacted. This provides the advantage that the plug-type connector or the electronic device, preferably an antenna amplifier, is fixed directly on the support film (2) and electrically contacted directly at the base of the antenna elements (3) to which high-frequency signals are to be transmitted via the plug-type connector or are to be processed further directly by the electronic device. In this manner connection lines that would also allow radiation of error signals can be omitted in an advantageous manner. Overall the vehicle antenna according to the invention can therefore be built in a more compact manner. A further simplification with regard to storage of such a vehicle antenna, e.g. after manufacture and before installation in a vehicle, is provided, since the antenna elements forms a single part together preferably with the electronic device, thus having to be provided with only one part number such that logistics is therefore also simplified overall. Installation of such a vehicle antenna is also simplified, since only a compact part must be installed that simultaneously consists of a receiver antenna (and/or transmission antenna) with related plug-type connector, or with related electronic device.

BRIEF DESCRIPTION OF THE DRAWING

Further embodiments of the invention are described in the dependent claims, the further embodiments being described in further detail based on the following description with reference to the embodiments shown in the figures. Therein:

SPECIFIC DESCRIPTION

Figure 1:
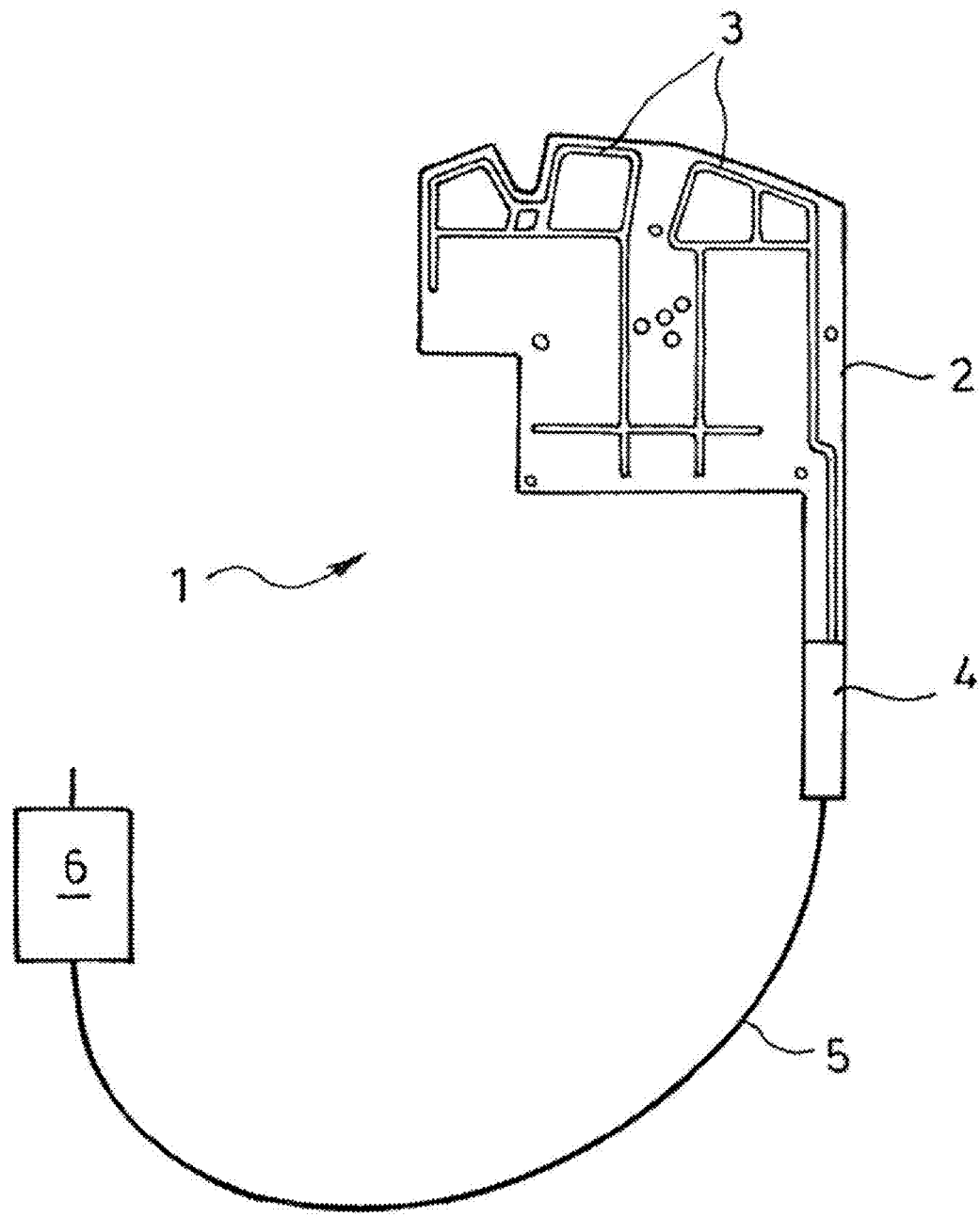
FIG. 1 is a schematic view of an antenna according to the invention in flat condition.

FIG. 1 shows in detail a vehicle antenna 1, where one or more antenna elements 3 are carried by a support film 2 of a dielectric material, particularly a flexible plastic film. The fixing of the antenna elements 3 is advantageously done by printing, such as screen printing an electrically conductive paste, preferably a silver polymer paste, onto the flat support film 2. Other methods of application and other materials are also conceivable for the antenna elements 3. A tab projects from the support film 2 and carries a plug-type connector 4 at an end forming a base of the antenna elements 3. This way, an unillustrated connector matable with the plug-type connector 4 can be mechanically and electrically connected to the base of the antenna elements 3. This can be cone, for example, by crimping, soldering, or other processes. The vehicle antenna 1 is connected by the plug-type connector 4 to an electronic device, such as an antenna amplifier, an impedance converter, a receiver, or the like, elsewhere in the vehicle by a cable 5, preferably a coaxial cable. The vehicle antenna 1 shown in FIG. 1 represents the simplest embodiment of the vehicle antenna 1 according to the invention, the support film 2 being already formed with cutouts in its outer edge and with cutouts, particularly rounded ones, by means of which the support film 2 is oriented and attached at the desired installation location. The edge shape of the support film 2 may be done, for example, by cutting out or punching from a larger support film.

Figure 2:
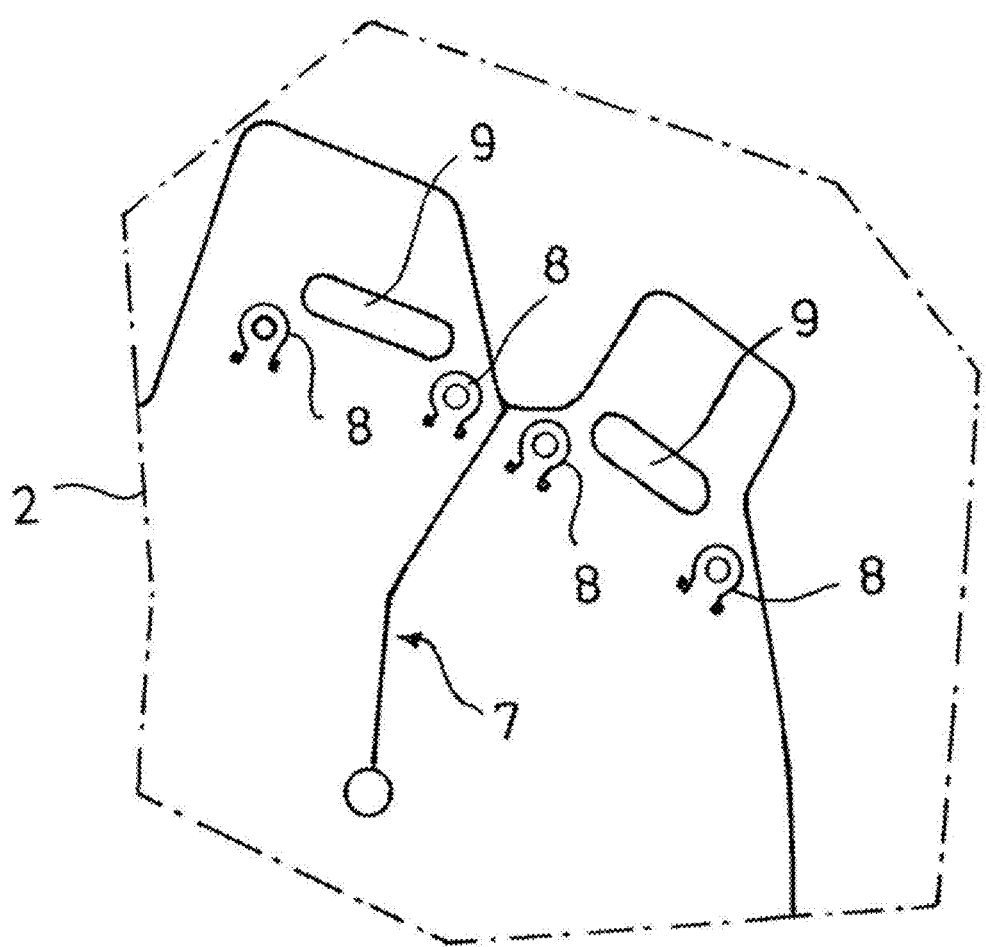
FIGS. 2 and 3 are detail views of antennas in accordance with the invention.

A further embodiment of the invention is shown in FIG. 2. Here the support film 2 is provided with at least one separating cut 7 before or after the plug-type connector 4, or the electronic device 6 has been mounted, thus subdividing the support film 2 into at least two regions that can move independently of each other yet are still connected to each other. This separating cut may also be done by a cutting or punching process. Other methods for achieving the described effect are also conceivable. The separating cut preferably extends inward from one edge of the support film 2 such that at least two or more regions are created that can be moved independently of each other, yet are still connected to each other. Because of the separating cut 7 in the support film 2 further stiffening and shaping for installation without the use of tools may be achieved by overlapping the connected-together regions, the two connected-together regions are folded over and preferably placed on top of each other in a plane. In this manner a three-dimensional adjustment of the inherently planar support film 2 to the desired installation location may be done without the use of any tools by the described "folding technique." In order to be able to install the support film 2 processed in this manner at the desired installation location, it is provided with at least one attachment formation 8, preferably multiple attachment formations 8. The invention therefore provides that each attachment formations 8 is punched out, the area of the support film 2 punched out for forming the attachment formation 8 remaining on it and being folded up at least during the attachment process. This has the advantage that no waste of support film parts is created during the punching-out of the attachment formations 8. Furthermore, the areas of the attachment formations 8 folded away and remaining on the support film 2 do not interfere with the subsequent function of the vehicle antenna 1. Cutouts 9 are provided as a guide for use during installation of the prepared support film 2 and/or for accurate shaping, particularly during overlapping of the regions of the connected-together regions of the support film 2, such that the correct position of the connected-together regions of the support film 2 toward each other is ensured when performing the "folding technique" by flush overlapping of the cutouts 9. Furthermore, the cutouts 9, preferably in the overlapped state of the regions of the support film 2, may serve for guiding and fixing the position of the support film 1 at the desired installation location.

Figure 3:
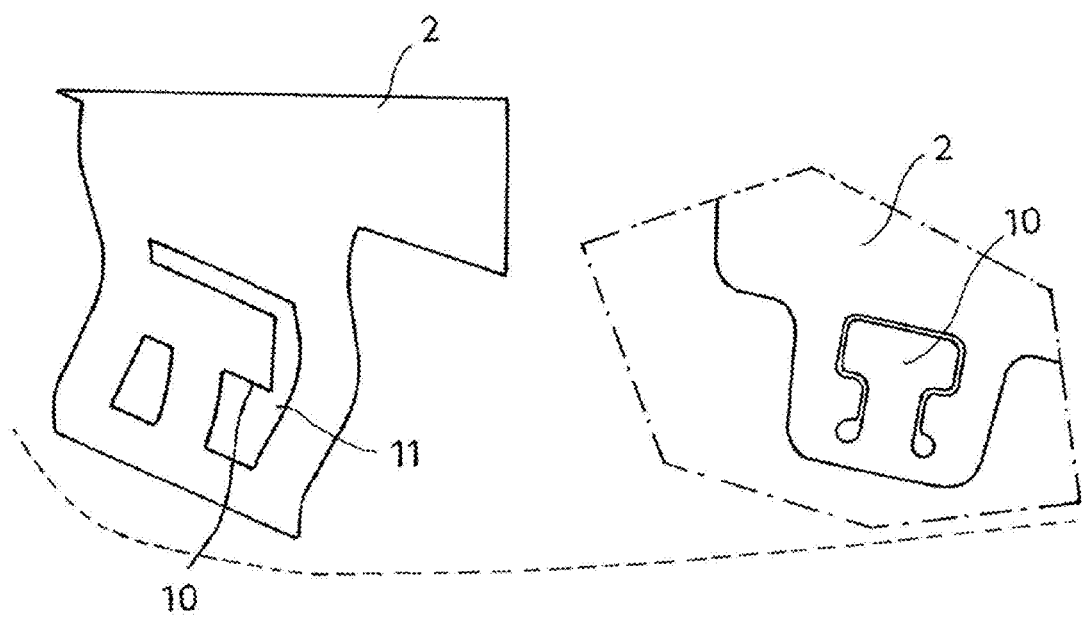
Figure 4:
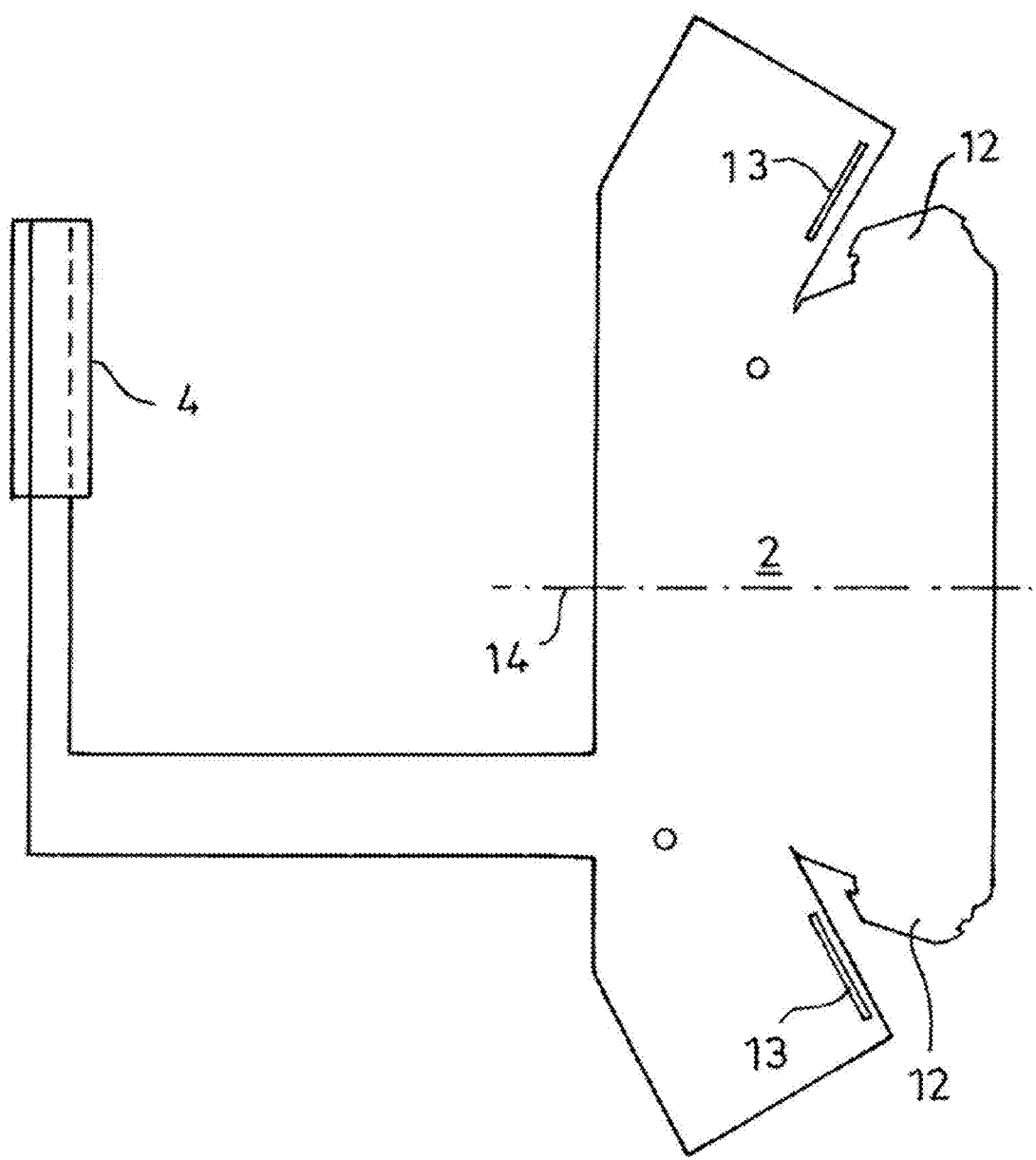
FIGS. 4 and 5 are views of another antenna according to the invention in flat and three-dimensional condition.
Figure 5:
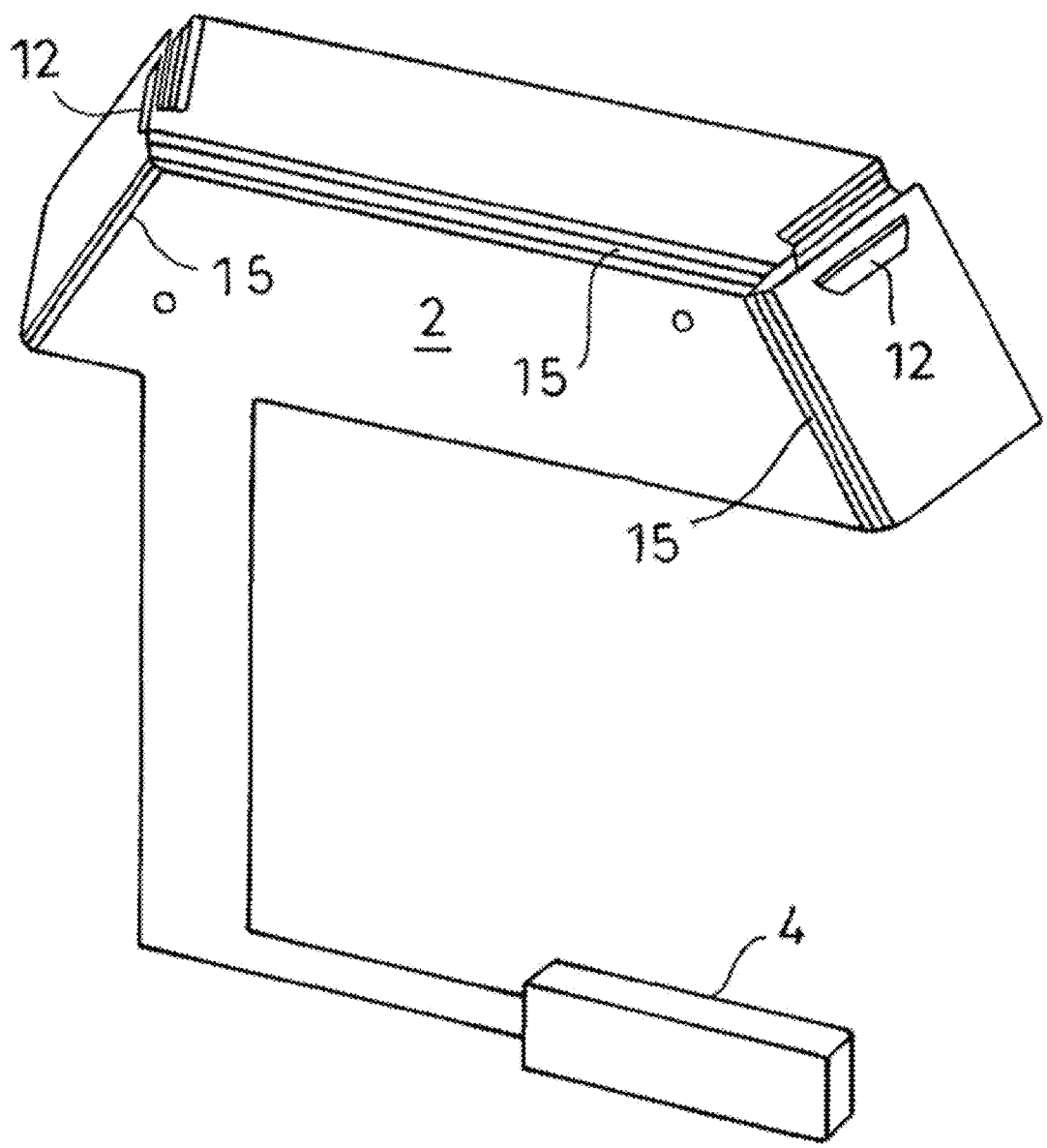

FIG. 3 shows that the support film 2 is provided with at least one additional cutout 11, also made by punching. Here a punched-out part of the support film 2 remains as an attachment tab 10 within the cutout 11, by means of which the support film 2 is attached at the desired installation location. The left side of FIG. 3 shows that the attachment tab 10 is approximately T-shaped, parts of the support film 2 being punched-out and removed. It is conceivable that the resultant attachment tab 10 is folded inward toward itself at least once more for reinforcement. The right side of FIG. 3 shows that only the attachment tab 10 is punched out so that folding-back the punched-out attachment tab 10 creates the cutout 11, which is not explained in further detail. The attachment tab 1, particularly also multiple attachment tabs 11 provided at the required locations, has the advantage that the support film 2 can be attached by hinging it, and preferably also by locking or tensioning it to a vehicle part. This advantage is present in particular, if, for example, two opposite attachment tabs 11 grip opposite sides of the vehicle part. In addition or alternatively to a nonpositive connection of the attachment tabs 11 to the vehicle part, it is conceivable that the vehicle antenna 1 is connected to the vehicle part in a form-fit via the attachment tabs 11, such as by a gluing process.

FIGS. 3 and 4, and 5 to 7 show that the planar support film 2 is provided with at least one projecting tab 12, preferably multiple projecting tabs 12, before attaching the plug-type connector 4 or the electronic device 6. Here the still planar support film 2 does not have a shape corresponding to the desired three-dimensional installation location. A cutout 13 is formed in the support film 2 for shaping the subsequent three-dimensional vehicle antenna 1 to the projecting tab(s) 12, into which the tab 12 is inserted after the support film 2 has been deformed, e.g. bent over or folded over symmetrically or asymmetrically to a symmetry axis 14 of the support film 2. The deformation occurs, for example, at a smaller or a large bending radius along crease lines 15, it also being conceivable that the deformation occurs at a certain angle, preferably a right angle. With the deformation shown in FIG. 5 the projecting tabs 12 have been folded over relative to the rest of the support film 2, and in this illustrated embodiment regions in which the cutouts 13 are located of the support film 2 have also been folded over. The outer ends of the projecting tabs 12 are pushed through the cutouts 13, and in a particularly advantageous manner the free outer end of the projecting tab 12 shaped like a hook or preferably multiple hooks that project outward and engage the support film 2 from behind after fitting the tab 12 through the cutout 13, thus fixing the outer end of the projecting tab 12. The outer tab end is provided with a taper for the purpose of a simpler insertion of the it through the cutout 13. Due to the approach described an antenna that approximately has the shape of a box may be created in this case from an initially planar support film 2, the inner or outer shape of the now three-dimensional support film 2 being complementary to the desired installation location. Depending on the size of the projecting tabs 12, the orientation of the crease lines 14, and the folding processes to be done, nearly any desired number of complex, three-dimensional shapes may be achieved with a previously planar support film 2.

Figure 6:
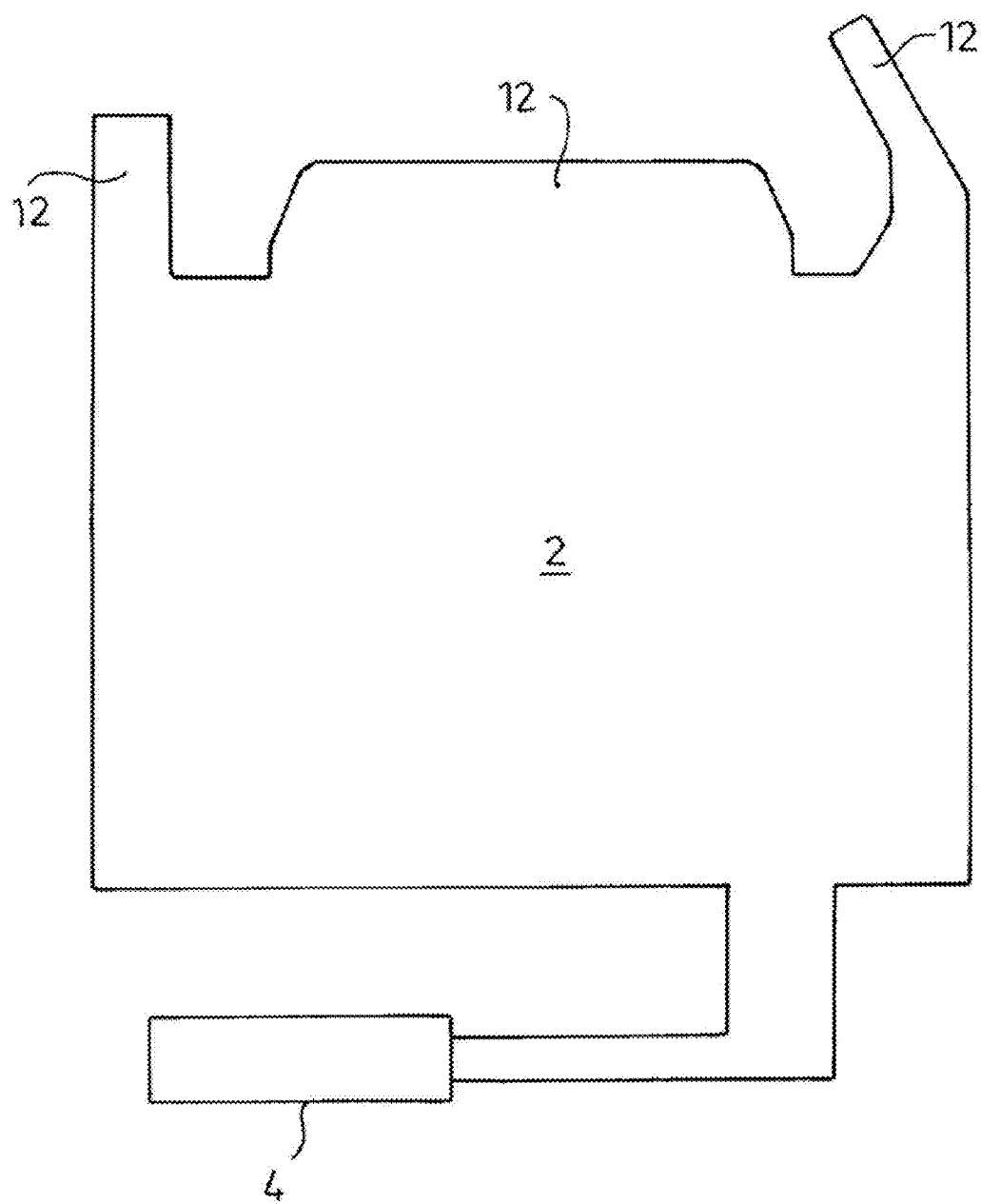
FIGS. 6, 7, and 8 are successive views of another antenna in flat, partially shaped, and installed condition.
Figure 7:
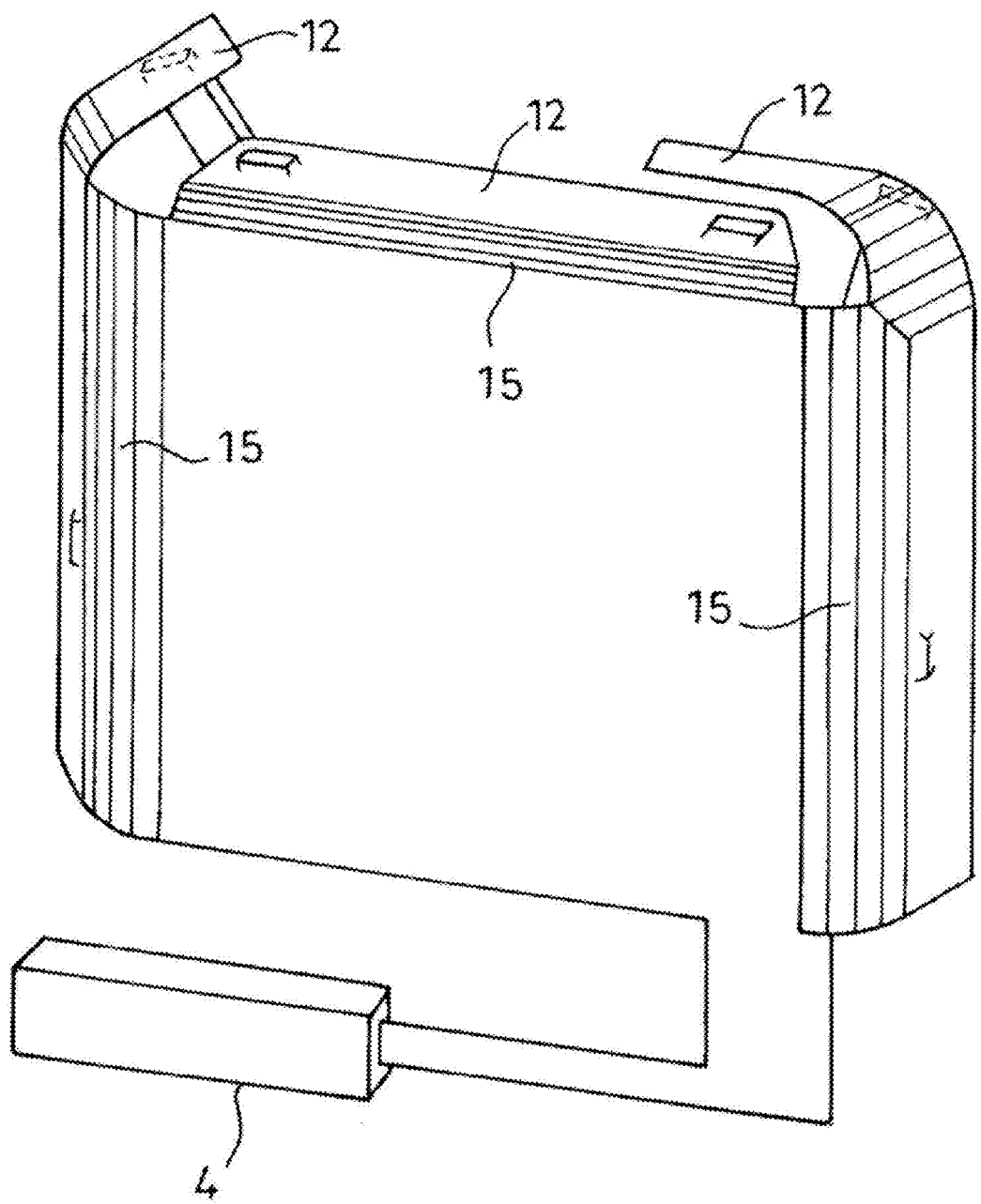
Figure 8:
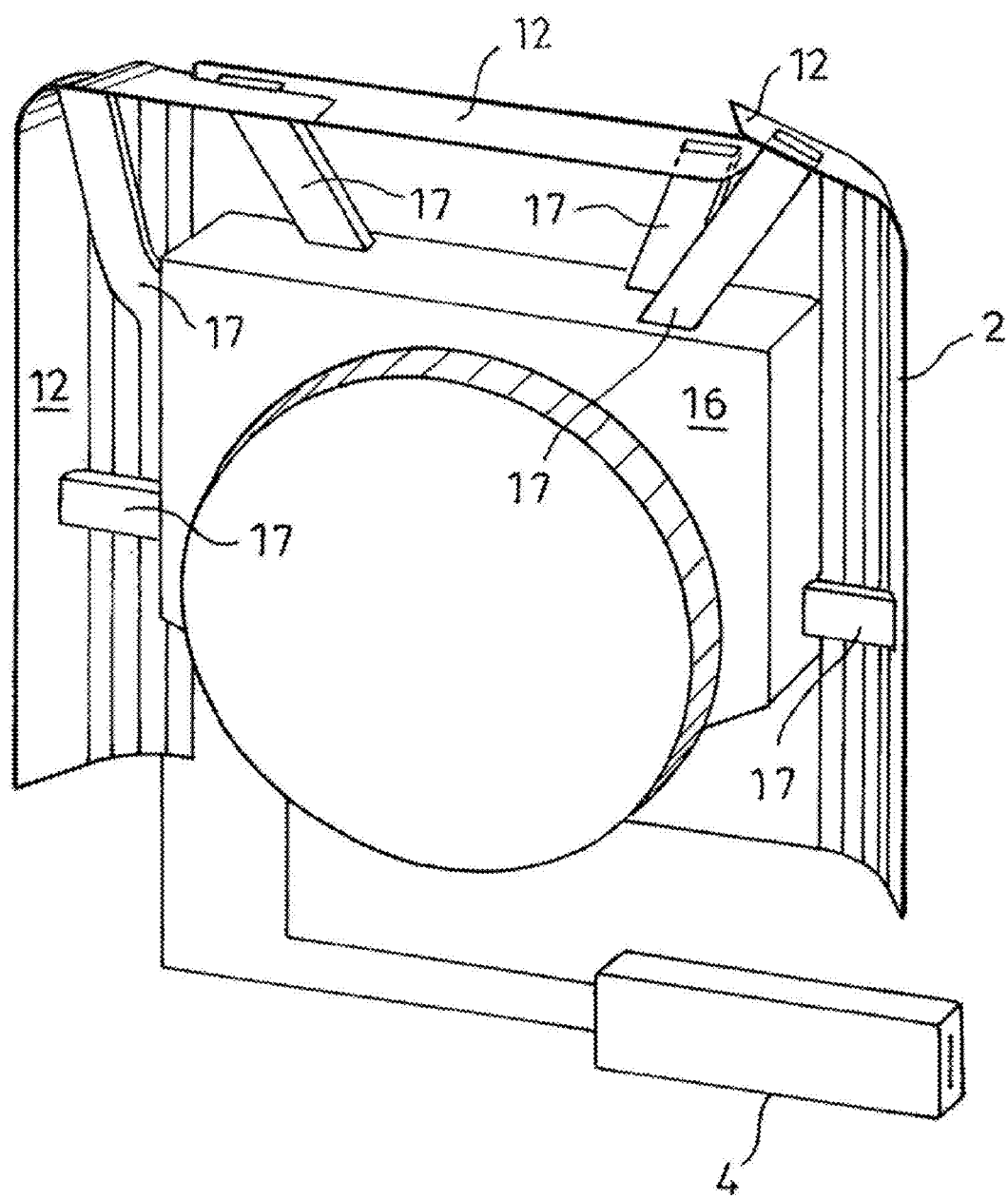

A somewhat more complex shape of the support film 2 is shown in FIGS. 6 to 8. The support film 2 is again provided with multiple projecting tabs 12, however regions of the support film 2 are not folded over along the crease lines 15 in this case but are bent over such instead if a sharp a rounded deformation region is created along the crease lines 15. After the support film 2, based on the initially planar support film 2 (FIG. 6), has been three-dimensionally deformed (FIG. 7), the attachment of the support film 2 deformed in this three-dimensional manner to a vehicle part 16 (FIG. 8) is done. In a first variation (not shown) it is conceivable that, for example, the bent-over regions of the support film 2 fit around the vehicle part 16 at least partially, particularly completely at the side edges thereof such that the support film 2 is fixed to the vehicle part 16 by such a positive fit. In the embodiment shown in FIG. 8 the vehicle part 16 has struts 17 extending outward and connected at their ends to the bent-over regions of the support film 2. This may be by nonpositive fit or by positive fit. It is also conceivable that the struts 17 are independent parts that connect the support film 2 to the vehicle part 16.

Figure 9:
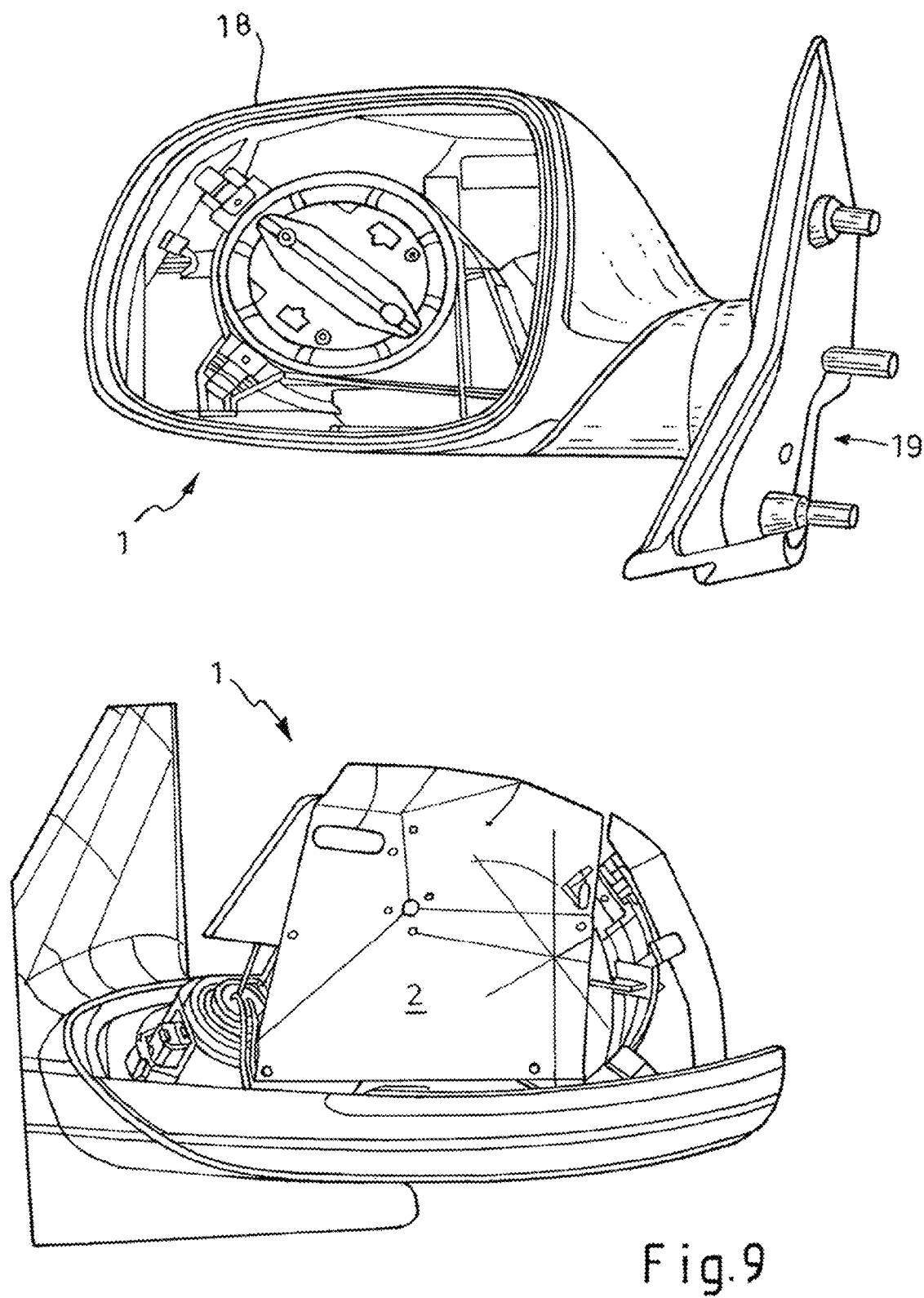
FIG. 9 is back and top view of the shaped antenna according to the invention on installation into a vehicle outside mirror assembly.

FIG. 9 shows a particularly preferred embodiment of the vehicle antenna 1 made by the method of this invention. The three-dimensional prepared support film 2 is shaped such that it corresponds to the desired installation location, e.g. within a housing of an outside vehicle mirror 18. To this end the inner shape of the housing of the outside mirror 18 is extremely complex (arched), and there is little installation space available because not only must the vehicle antenna 1 be accommodated inside the housing of the outside mirror 18, but also the adjusting mechanism for the actual mirror of the outside mirror 18. The illustrated embodiment of an outside mirror 18, which is connected to a vehicle door (not shown) via a mount 19, is shown in the upper part of FIG. 9. The vehicle antenna 1 can be seen in the lower part of FIG. 9 and is comprised of the complexly shaped support film 2 that has been produced by the above described "folding technique." It can be seen that the vehicle antenna 1 has multiple crease lines and attachment formations, and optionally also cutouts. Although the illustrated embodiment of accommodating the vehicle antenna 1 according to the invention in an outside mirror 18 of a vehicle is preferred, other installation locations within or on vehicle parts are also conceivable.

It should finally be noted that the above-discussed figures have shown that the plug-type connector 4 is arranged at the base of the antenna elements 3 (or also at the bases of multiple antenna elements). As an alternative the electronic device 6, particularly the antenna amplifier, may be connected directly to the base of the antenna elements 3 (or at the bases of multiple antenna elements) instead of the plug-type connector 4, the electronic device 6 and the region of the support film 2, on which the electronic device 6 (or the plug-type connector 4) is arranged, being provided with a protective housing in a particularly advantageous manner. The protective housing can be a separate part, such as two or more housing parts (preferably two housing halves). It is also conceivable that the protective housing is produced by an injection-molding process, or by molding, for example, in a hot-melt process.

It should be noted that the projecting attachment tabs 12, which are created either by punching out of the planar support film 2 or are formed by carrying out the separating cut 7, are deformed from the largely planar remaining region of the support film 2 by folding over or bending over such that deformation of the projecting outer regions of the support film 2 or of its tabs occurs at a desired angle with regard to the planar remaining part of the support film 2, or such that the deformation occurs at 180 degrees such that the planar remaining region of the support film 1 and the folded over region come to rest on top of each other. In this case it may be conceivable to additionally connect the regions placed on top of each other after the deformation process, such as by gluing them to each other. It is also conceivable that the regions or attachment tabs projecting from the remaining region of the of the support film and to be deformed, are deformed such that they are deformed in an angular or arched manner several times such that in the latter case, for example, a U-shaped profile is created seen in cross-section at the deformed regions.

In correlation to the manufacturing method or to the vehicle antenna produced using this method, the following characteristics should be enumerated. The direct electric contacting of the base of the one antenna element of the plug-type connector or to the signal input of the electronic device occurs, as described above, by a crimp connection, by a crimp-soldering connection, by a riveting process, by an action pin, by a conductive adhesive, or the like. An organic film may also be considered as the support film to be laminated onto a support (such as a printed circuit board), and the assembly of the carrier with the parts serving for realizing the function of the electronic device is subsequently done. Furthermore, the separating cuts, the crease lines, the associated tabs, and folded or bent-over regions of the carrier foil are done in a symmetric manner such that the vehicle antennas thus resulting can be produced and mounted in a mirror-image manner. This applies, for example, to the use of such a vehicle antenna in a right and into a left outside mirror of the vehicle. This means vehicle antennas that are manufactured either identically or as mirror images of one another for both sides of the vehicle. The frequencies or frequency ranges (bands and the services thereof, such as television, cellular phone technology, radio, and the like) to be received by the one antenna element, or the multiple antenna elements, may be established without problem by electrically conductive structures provided on the support film in a different manner. Another advantage of the invention is the simple transport and the cost-effective storage of the finished, yet still planar support film comprising the attached antenna elements from the manufacturer to the automobile manufacturer, the finished vehicle antenna merely having to be folded together and plugged in shortly before installation at the installation location in a final step.

The invention claimed is:

1. A method of making a vehicle antenna having a support film of a dielectric material and antenna elements of an electrically conductive material carried on the support film, the method comprising the steps of:
   fixing a plug-type connector or an electronic device directly to the support film at the base of the antenna elements so as to be electrically connected with the antenna elements;
   providing the planar support film with at least one projecting tab before or after fixing the plug-type connector or the electronic device to the support film;
   forming a cutout associated with the projecting tab in the support film;
   deforming the support film along a crease line;
   thereafter inserting the tab into the cutout while deforming the support film and antenna elements into a three-dimensional shape corresponding generally to an inner surface of a motor-vehicle outside-mirror housing; and
   fitting the deformed support film and antenna elements into the outside-mirror housing before installing a mirror in the housing.

2. The method according to claim 1, further comprising the step of
   providing the support film with at least one separating cut that subdivides the support film into at least two regions that can be moved independently of each other yet are still connected to each other.

3. The method according to claim 1, further comprising the step of
   providing the support film with at least one attachment formation.

4. The method according to claim 3 wherein the attachment formation is punched out so as to remain attached to the support film while being tilted away from the support film.

5. The method according to claim 1, further comprising providing the support film with at least one cutout.

6. The method according to claim 5 wherein a punched-out region of the support film remains in the cutout as an attachment tab on the support film, the method further comprising the step of
   attaching the support film by means of the attachment tab to an installation location.

7. The method according to claim 1, further comprising the step of
   providing the plug-type connector or the electronic device and the region of the support film carrying the plug-type connector or the electronic device with a protective housing.

8. A vehicle antenna made by the method of claim 1.

* * * * *